Feb. 16, 1965      A. B. LEVINE      3,170,008
EMBOSSING PROCESS
Filed March 14, 1961
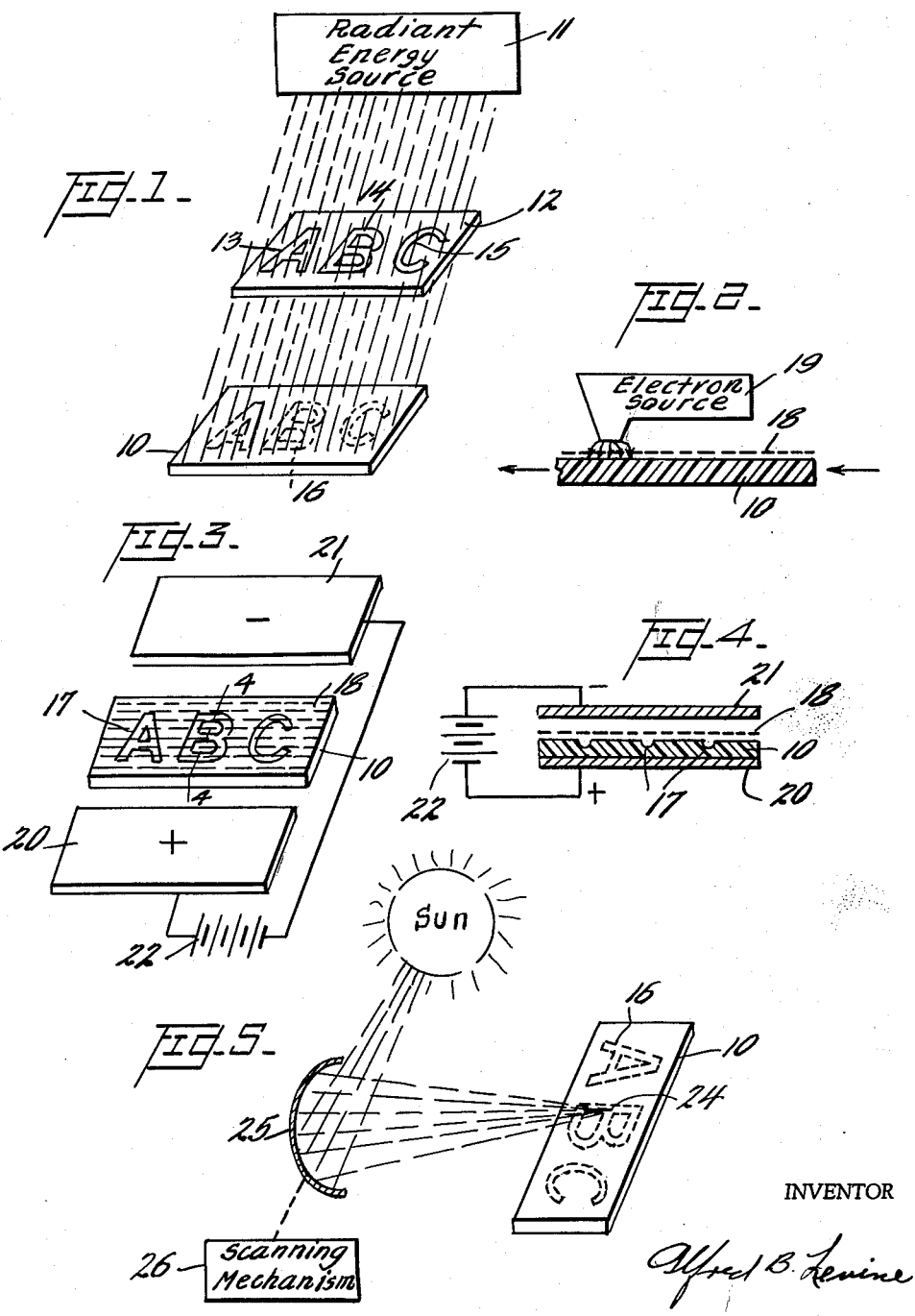
INVENTOR
Alfred B. Levine

United States Patent Office 3,170,008
Patented Feb. 16, 1965

3,170,008
EMBOSSING PROCESS
Alfred B. Levine, Chevy Chase, Md., assignor to
Litton Systems, Inc., College Park, Md.
Filed Mar. 14, 1961, Ser. No. 95,564
17 Claims. (Cl. 264—22)

This invention generally relates to processes for producing designs and images on thermoplastic materials and is particularly concerned with thermoelectrical processes for reproducing art work, designs, and various other forms of intelligence by deforming the surface of a thermoplastic material in a pattern configuration corresponding to the desired intelligence.

As used throughout this specification and claims, the terms "deform" and "deforming" are used in a broad context to mean a change in physical shape or form of a material.

It is a principal object of the invention to provide a process for very accurately and precisely deforming the surface of a thermoplastic material in a pattern corresponding to a desired intelligence pattern.

A further object is to provide such a process in which the deformation pattern may be obtained in very fine detail and with great definition.

Another object is to provide such a process permitting either a great quantity of intelligence to be stored in an extremely small area of the thermoplastic material or an enlarged reproduction of an intelligence image to be obtained over an extended area of the thermoplastic.

A still further object is to provide such a process that is both rapid and accurate and wherein a large number of identical reproductions may be obtained of a given configuration without loss of definition.

Still another object is to provide such a process wherein the pattern on the thermoplastic may be retained in a permanent form or erased at will enabling the thermoplastic to be used over and over again if desired.

Very generally according to the invention there is provided a process for embossing or deforming a surface region of thermoplastic material according to a desired image or pattern by the combined use of heat and electrically produced forces. In one preferred embodiment, the pattern to be reproduced is obtained by first producing a two-dimensional heat pattern of the configuration desired over the surface of the thermoplastic with the intensity of heat being produced at each different position on the surface being proportional to the depth of indentation or deformation to be produced at that given position. This heat pattern serves to variably soften discrete positions of the thermoplastic material in the desired two-dimension pattern. In the next step, which may also be performed before or coincidentally with the production of the heat pattern, the entire surface region of the material for receiving the heat pattern is subjected to a strong electric field, producing a dielectric force tending to deform the thermoplastic. The intensity of the field is made sufficiently great to deform or emboss the surface of the thermoplastic at these different positions that have been softened by the heat pattern but is not sufficient to deform the unheated regions of the plastic. In this manner, the surface regions of the plastic are variably deformed according to the predetermined image or pattern desired.

Other objects and additional advantages will be more readily understood by those skilled in the art after a detailed consideration of the following specification taken with the accompanying drawings wherein:

FIGS. 1 to 3, inclusive, are schematic illustrations of a progressive series of steps for practicing the invention, in one form thereof;

FIG. 4 is a cross sectional view of the parts shown in FIG. 3 in assembled relationship, and FIG. 5 is a pictorial illustration of an alternative manner of providing a latent heat pattern according to the invention.

Referring now to the drawings, there is shown in FIGS. 1 to 4 one sequence of steps that may be performed for embossing or producing a deformative pattern such as the letters ABC on the surface of a thermoplastic member 10 according to the invention.

As shown, in FIG. 1, in the first step the upper surface of plastic 10 is nonuniformly heated by a strong light ray, infrared beam or other suitable radiation indicated as 11 in the configuration of the pattern which it is desired to emboss or deform on the thermoplastic material. The nonuniform heat pattern may be obtained by such means as masking a source of the heating rays 11 through an opaque templet member 12 with suitable cutout portions 13, 14, and 15 configured in the pattern of the letters ABC thereby permitting the heat rays to pass through the cutouts and form a heat image 16 on the plastic 10. Alternatively, the masking member 12 may be a photographic transparency having opaque and transparent areas therein in the desired pattern or any other of the many known means for projecting an enlarged or diminished image of the pattern as known in the art.

The heat radiation striking the thermoplastic in the pattern 16 desired is applied at a desired intensity and continued for a time duration that is sufficient to variably soften the heated portions of the surface in the configuration of the image 16, thus providing the upper surface of the plastic with a latent image of the pattern 16 in the form of softened areas in the plastic.

In the following steps as generally illustrated by FIGS. 2 and 3, the plastic member 10 having the softened latent image 16 therein is then subjected to a uniform electric field being directed transversely through the member and exerting a uniform dielectric stressing of the member at each position along its surface. The electric field produces a uniform dielectric stressing force in the plastic member 10 that is normally insufficient to distort the member. However, at those discrete positions forming the latent image 16, the plastic has been sufficiently softened that the application of the transverse electric field produces a flow of the plastic to create deformations therein in the form of ridges, valleys, wrinkles or the like 17, as indicated in FIG. 4. Thus, upon the application of an electric field, the heat softened areas on the plastic member are deformed to develop the latent heat image 16 into a configured pattern of embossing on the surface of the plastic member. After the passage of a sufficient period of time to permit the thermoplastic to be cooled, the heat softened areas thereon are again hardened to freeze the deformed or embossed configuration in the plastic as is desired.

In performing the steps of applying the uniform electric field to stress the plastic as described, it is preferred that the upper surface of the plastic member first be sprayed or wiped with a negatively charged layer of electrons 18 from a suitable source 19, as shown in FIGS. 2 and 3, and that thereafter the plastic member be subjected to a high intensity transverse electric field by such means as being placed between positive and negative energized capacitor plates 20 and 21 that are connected to opposite terminals of a high voltage direct current source 22. The high voltage positive plate 20 is placed underneath the plastic member 10 thereby attracting the electrons 18 on the surface of the plastic downwardly toward the plate 18 and in so doing exert the necessary stress to deform the heat softened surface areas of the plastic member 10 as described above. However, this intermediate step of negatively charging the surface of the plastic is not essential to deforming the plastic and the application of a sufficiently strong electric field applied by the capacitor plates 20 and 21 will deform the heat softened areas on the thermoplastic material.

As generally indicated above the cooling and consequent rehardening of the heat softened areas on the plastic member 10 serves to freeze and permanently retain the deformation pattern or image in the plastic. However, if it is desired to erase this pattern and restore the plastic member to its blank or undeformed condition, this may be easily performed by uniformly heating the entire surface of the member 10 sufficiently so that the plastic flows to fill in the cavities, undulations, wrinkles 17 and the like formed in the embossed pattern. Alternatively, a large number of thermoplastic materials are known that possess a "plastic memory" and will return to their original shape and configuration upon the application of heat. By using these known materials, the embossed or deformation pattern may be erased without the need for heating the member 10 until it reaches plastic flow or melted condition.

Although in the process steps as described above, the heat pattern is first applied to the plastic and thereafter an electric stressing force is applied to deform the heat softened areas, it is believed evident that these steps may be reversed in time or applied simultaneously. By reversing the steps, the thermoplastic member may be first subjected to a uniform electric field that is insufficient to deform the hard plastic but does exert a sufficient dielectric force to deform the plastic as described after the application of the heat image thereto to variably soften the plastic. If the nonuniform heating and electric stressing steps are applied simultaneously, the result is the same since the plastic will be deformed when it becomes softened. In those instances where the two steps are applied simultaneously or where the electric field is applied first, the capacitor plates 20 and 21 may be replaced by fine crossed wire grids or screens functioning as the capacitor elements to enable the heat radiation 11 to pass through the open meshes of the grids to heat the plastic member.

By the process of the present invention, the deformation pattern or image being created on the thermoplastic member may be greatly enlarged or diminished in size from that of the templet or pattern means 12 by employing suitable optical lens and other known optical elements and projecting systems for condensing or expanding the light or heat rays 11 to provide a larger or smaller reproduction of the heat image 16 as might be desired.

Alternatively, the heat image 16 may be formed on the thermoplastic 10 in any desired pattern by repetitively scanning an extremely fine pencil beam of radiation 24 over the surface thereof in the desired path configuration as is illustrated in FIG. 5. As schematically shown in FIG. 5, a fine pencil beam 24 of intense heat radiation from the sun may be employed and focused by an eliptical reflector 25 or other condensing and focusing system and this intense fine beam may be directed to scan a desired heat pattern 16 on the thermoplastic 10 by positioning the reflector member 25 by means of a mechanical drive scanning mechanism 26 in the desired pattern. In this instance, the fine beam 24 may be repetitively traced over the pattern 16 until the plastic 10 is sufficiently softened in those areas to enable the deformation pattern to be formed on the plastic upon the later application of the electric field.

The deformation or embossed pattern may be obtained and "frozen" quite rapidly by applying a high intensity heat pattern for a short time interval and artificially cooling the material thereafter by suitable refrigeration or other known cooling means. Such a high intensity heat image may be obtained from various radiant energy sources other than the sun's rays, such as carbon arc lamps or devices, photoflash lamps, chemical or other explosions and the like.

The intensity of the constant electric field and/or the magnitude of the electric charges applied to the thermoplastic may also be varied as desired as may the thickness of the material or layer of thermoplastic material employed.

With regard to the thermoplastic material to be employed, a wide variety of dielectric thermoplastics are suitable such as various of the waxes, natural and synthetic resins, and various gelatinous materials, such as those formed of silicone oil.

Since these and many other variations and modifications may be made by those skilled in the art, this invention is to be considered as being limited only according to the following claims.

What is claimed is:

1. A process for providing an image on a thermoplastic member by deforming the surface of the member in a pattern corresponding to the image comprising the steps of producing a two-dimension heat pattern corresponding to the image, exposing a region of a thermoplastic record member to the heat pattern thereby to heat and raise the temperature of different discrete positions on the thermoplastic record in a two-dimensional configuration according to the pattern of information to soften the record member at said discrete heated positions, and subjecting the region of the record member exposed to the heat pattern to an electric field of sufficient intensity producing a dielectric force to deform the thermoplastic at the heated positions but of insufficient intensity to deform the unheated positions thereon.

2. In the process of claim 1, the further step of erasing the deformation pattern on the record by reheating the record.

3. In the process of claim 2, the step of erasing the deformation pattern being produced by employing a thermoplastic material having a plastic memory whereby reheating of the record resoftens the material to permit the deformed positions to return to their original condition.

4. In the process of claim 2, the step of erasing the deformation pattern being produced by reheating the thermoplastic material sufficiently to enable plastic flow of the material thereby to erase the deformation.

5. A process for embossing a dielectric thermoplastic material in a predetermined two-dimensional pattern comprising the steps of nonuniformly heating different discrete positions over a surface region of the material in a pattern configuration corresponding to the predetermined pattern, and subjecting the material to an electric field to deform the material at the positions receiving sufficient heat but not the positions that have been insufficiently heated.

6. In the process of claim 5, the step of nonuniformly heating the different positions over the region being performed by scanning the region with a radiant beam in the pattern desired.

7. In the process of claim 5, the steps of nonuniformly heating the surface region of the material and subjecting the material to an electric field being performed simultaneously.

8. In the process of claim 5, the step of nonuniformly heating the surface region of the material being applied after subjecting the material to the electric field.

9. In the process of claim 8, the step of heating the material being performed by scanning the surface thereof with a moving beam of radiant energy traveling in the predetermined configuration desired to heat those discrete positions on the surface where it impinges.

10. In the process of claim 9, the additional step of repetitively scanning the beam to trace the surface pattern for a variably predetermined number of cycles to obtain correspondingly variable depths of deformation of the pattern in the material.

11. A process for thermoelectrically deforming a dielectric thermoplastic material comprising the steps of uniformly stressing the material by the application of an electric field and nonuniformly applying heat to material under stress in the deformation pattern desired thereby to soften the material in different heated areas sufficiently for the electric field to deform the softened areas but not the remaining areas.

12. A process for embossing a dielectric thermoplastic material according to a desired intelligence pattern or design comprising the combined steps of applying to the material a nonuniform latent heat pattern in the desired configuration and subjecting the material to an electric force producing a dielectric stress whereby the combination of heat and electric stress produces an embossing of the material in the desired configuration, the additional step of varying the extent of deformation at different regions in the pattern, said variable extent of deformation at different regions in the pattern being performed by applying to the material a heat pattern of nonuniform intensity whereby one heated region receives more heat than another heated region.

13. In the process of claim 12, the step of applying the heat being performed by producing radiant energy beams in the spatial configuration desired and at nonuniform intensities and applying said beams simultaneously to a region of the material.

14. In the process of claim 12, the step of applying the heat pattern being performed by scanning a fine beam of radiant energy over said material in the pattern desired.

15. In the process of claim 14, the step of scanning the beam being performed in such manner as to nonuniformly heat the material at different positions in the image.

16. A process for embossing a dielectric thermoplastic material according to a desired intelligence pattern or design comprising the combination of steps of applying thereto both a uniform electric field and a nonuniform heat pattern in the desired intelligence pattern whereby the electric field uniformly stresses the material and the heat pattern softens regions of the stressed material enabling deformation thereof; the step of applying the electric field being performed by depositing a uniform electric charge to the material over the region to be occupied by the pattern and subjecting the material to an opposite polarity electric potential at positions spaced from the charge thereby to impose an electric stress on the material in such region.

17. A process for providing a deformation image on a dielectric material that is absorptive of radiant wave energy to become more plastic in the areas subjected to the wave comprising the combined steps of subjecting the material to the radiant wave in the pattern desired to provide a latent image of more plastic areas in the material, and subjecting a region of the material including the latent image areas to a dielectrically produced force to stress the material over said region sufficiently to deform the more plastic areas and thereby develop the latent image but insufficient to deform the areas of said region that are not rendered more plastic by the wave energy.

References Cited by the Examiner
UNITED STATES PATENTS

| | | | |
|---|---|---|---|
| 2,468,731 | 5/49 | Borkland | 41—24 |
| 2,699,113 | 1/55 | Hoover | 250—65.1 X |
| 2,808,777 | 10/57 | Roshkind | 250—65.1 X |
| 2,825,814 | 3/58 | Walkup | 250—49.5—6 |
| 2,948,929 | 8/60 | Stallard | 41—24 X |
| 3,055,006 | 9/62 | Dreyfoos et al. | |

FOREIGN PATENTS 569,340   5/45   Great Britain.

OTHER REFERENCES

February 1960, pages 76–79, TPR-Recording, in Electronic Industries.

ALEXANDER H. BRODMERKEL, *Primary Examiner.*

RALPH G. NILSON, MORRIS LIEBEMAN, *Examiners.*